June 13, 1967 G. V. JACOBY 3,325,715

MOTOR CONTROL APPARATUS

Filed May 3, 1966 2 Sheets-Sheet 1

INVENTOR.
GEORGE V. JACOBY
BY John V. Regan
ATTORNEY

United States Patent Office 3,325,715
Patented June 13, 1967

3,325,715
MOTOR CONTROL APPARATUS
George V. Jacoby, Bala-Cynwyd, Pa., assignor to Radio Corporation of America, a corporation of Delaware
Filed May 3, 1966, Ser. No. 547,252
3 Claims. (Cl. 318—293)

This application is a continuation-in-part of my copending application for Tape Handling Apparatus, Ser. No. 291,857, filed July 1, 1963, now Patent No. 3,250,480, issued May 10, 1966.

The present invention relates to improved motor control apparatus and, in particular, to electrical circuitry which facilitates smooth and rapid operation of a direct current motor.

Direct current motor apparatus is widely used in such systems as magnetic tape stations, navigational systems, radar systems, and the like, wherein it is required to control the motion and/or position of an object. For example, in magnetic tape stations including D.C. motor driven supply and take-up reels between which the tape is reeled by a tape drive arrangement, the reel motors are required to reverse their directions of rotation when the tape drive arrangement reverses the motion of the tape. For high-speed tape stations, such as digital types, this reversal must be relatively rapid.

In many of these systems, a single A.C. source supplies power to various electronic circuits in the system as well as to the motor control apparatus. Rectifier circuitry including one or more silicon-controlled rectifiers (SCR's) derive the required D.C. power for the motor from the A.C. source. Direct application of this rectified D.C. power to the motor causes inconsistent turn-off of the SCR's and results in heat losses in the motor. Moreover, the rapid turn-on and turn-off of the SCR's results in undesirable high frequency noise being reflected into the A.C. supply line, thereby affecting the operation of the various electronic circuits in the system.

An object of this invention is to provide new and improved motor control apparatus.

Another object is to provide improved motor control circuitry which facilitates smooth operation of a D.C. motor.

Still another object is to provide improved motor control circuitry which isolates the motor control circuitry frm the A.C. supply line.

Yet another object is to provide improved motor control circuits which facilitates the rapid reversal of rotation of a motor.

The present invention is embodied as a motor control circuit for a D.C. motor having armature winding means and field winding means connected in circuit with first, second and third terminals. Direct current power for the D.C. motor is derived from an A.C. source by a rectifier circuit means which includes at least first and second silicon-controlled rectifiers to provide first and second D.C. voltages between the first and third terminals and the second and third terminals, respectively. First and second capacitors are connected between the first and third terminals and between the second and third terminals, respectively, in order to filter the first and second D.C. voltages and to assure consistent turn-off of the SCR's. An inductive means is included in the coupling circuit between the A.C. voltage source and the rectifier circuit in order to isolate from the A.C. source the high frequency noise associated with the turn-on and turn-off of the SCR's.

The invention itself, both as to its organization and method of operation, as well as additional objects and advantages thereof, will become more readily apparent from a reading of the following description in connection with the accompanying drawings, in which.

The motor control apparatus of the present invention is contemplated for use in any system wherein it is required to control the motion or position of an object. Although not restricted thereto, the invention is illustrated in a magnetic tape station environment of the type described in my aforementioned copending application. As described therein, the magnetic tape station includes a supply and a take-up reel between which the tape is reeled by a tape drive arrangement past a magnetic recording head. The drive arrangement includes forward and reverse capstans which translate the tape between the reels and past the recording head. In accelerating the tape from rest to a very high speed in a very short time (for example, 150 inches per second in three milliseconds), the capstans impart relatively large accelerations to the tape. Due to the inertia of the reels, such high acceleration or deceleration is apt to produce undesired effects, such as stretching or breaking of the tape. In order to isolate the forward and reverse capstans from the reels, relatively low inertia tape loops are disposed in tape loop reservoirs between each capstan and one of the reels. Reel motors are provided to drive the reels so that the supply reel deposits tape into its associated loop while the take-up reel removes tape from its associated loop.

The present invention is particularly concerned with the control circuitry of the reel motors. Since the control circuitry for each reel motor is similar, only one of the reel motor systems is illustrated in FIG. 1.

Figure 1:
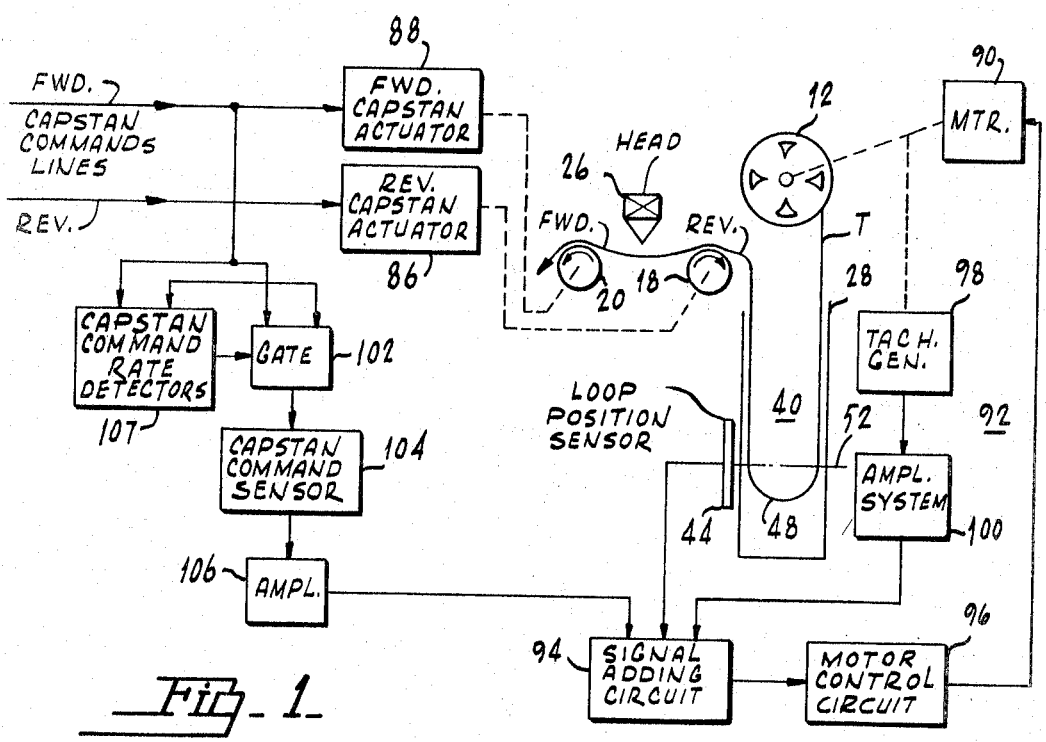
FIG. 1 is a diagram of part of a magnetic tape system, the diagram being partially in diagrammatic and partially in block form.

Referring now to FIG. 1, a magnetic tape T is shown wound on a right tape reel 12. It is understood that the tape is also wound on a left reel (not shown). Reverse and forward capstans 18 and 20 drive the tape T between the reels and past a magnetic recording head 26. The magnetic head 26 is capable of writing information on the tape 3 and reading information therefrom in accordance with appropriate commands received, for example, from a data processor system, not shown, or from an operator. The capstans 18 and 20 are continuously driven in opposite directions (as indicated by the arrows) by a capstan motor drive (not shown). The reverse capstan 18, for example, is made to grip and drive the tape in the reverse direction by means of a reverse capstan actuator 86 operated in response to a reverse command signal level supplied by way of a reverse command line. Similarly, the forward capstan 20 may be made to grip and drive the tape in the forward direction by means of a forward capstan actuator 88 operated in response to a forward command signal level supplied by way of a forward command line. The command signal levels may be generated in the computer or other data processing equipment which governs the entry and removal of information from the tape station. Forward and reverse commands do not occur simultaneously; however, these commands may occur in rapid sequence. The tape stops at the termination of the commands. Brakes in the form of vacuum shoes (not shown) adjacent the head 26 may be provided for attracting and stopping the tape when the capstans are de-actuated.

The path of the tape T includes a low inertia storage reservoir, such as a vacuum bin 28, in which a tape loop 40 is formed by vacuum means, not shown. A loop position sensor 44 is provided to sense deviations of the bight portion 48 of the tape loop from a reference position 52. The sensor 44 is a known device including a plurality of photosensitive devices associated with a circuit for combining the individual outputs of the devices to derive a resultant position error signal. Also associated with the photosensitive devices is a light source means, not shown. For a more detailed description of the loop sensor 44, reference is made to my aforementioned copending application. Again it is understood that an additional vacuum bin and tape loop sensor are associated with the left reel, none of which is illustrated for the sake of simplicity.

The reel 12 is driven by a motor 90, which may be a series direct current motor. A servo system 92 is associated with the loop position sensor 44 and the motor 90 for driving the motor in the proper sense and speed to maintain the loop 40 which isolates the capstans from the reel 12 in predetermined position with the bight 48 of the loop along the reference line 52. A similar motor and servo system is associated with the left reel 14.

The servo system 92 includes a signal adding circuit 94, which may be an amplifier and resistor network of the type described in my aforementioned copending application, and which combines the signal from the loop position sensor 44 with other signals and applies these signals to a motor control circuit 96. The motor control circuit 96 is of the type described in detail hereinafter for controlling the direction and speed of rotation of the motor 90, so as to maintain the tape loop 40 in its predetermined position. A rate damping loop is included in the servo 92. This loop includes a tachometer generator 98 which is coupled to the shaft of the motor 90 and provides a signal that is proportional to the speed of the motor 90 and indicative of its direction. The output of the tachometer generator 98 is amplified in an amplification system 100, which applies the signal at proper amplitude and phase to the signal adding circuit 94.

The forward and reverse command levels are transmitted through an "and" gate 102 to a capstan command sensor 104, which may be of the type described in greater detail in my aforementioned copending application. The capstan command sensor responds to the onset and termination of the forward and reverse command levels and provides an output signal which is amplified in an amplifier 106 and applied in proper phase to the signal adding circuit 94 to instantaneously actuate the motor control circuit 96 and the motor 90 at the beginning of the command and also at the termination of the command. The reel is instantaneously driven at the beginning of a command so as to provide a sufficiently large loop of tape in the bin 28 to facilitate the withdrawal or deposit of large amounts of tape from or into the bin, as may occur when the capstans 18 or 20 are initially commanded to start and accelerate the tape. The reels are also driven at the termination of a command in a direction to prevent the reels from excessively coasting and thereby depositing into or removing from the bin excessive amounts of tape. The tape position therefore remains in a relatively limited range about the predetermined position of the reference line 52. Accordingly, the longitudinal distance, vertically along the bin 28 which need be covered by the loop position sensor 44 is reduced and the size of the loop position sensor, accordingly, may be relatively small.

When a forward command level is applied to the forward capstan actuator, the tape is suddenly started from rest and accelerated in a forward direction. The tape is then withdrawn from the bin 28. When a reverse command occurs, a signal is generated by the capstan command sensor, which signal has a sense opposite to the sense of the capstan command signal which is generated in response to a forward command. The reel servo 92 is then actuated to drive the reel in a direction to instantaneously take up tape from the bin 28. Thus, tape is withdrawn from the bin before excessive tape can accumulate therein. Such tape accumulations are undesirable since the tape may fold over on itself and thereby become wrinkled or otherwise damaged.

In normal tape station operation, the tape may be stopped, started, and reversed very rapidly, for example, several hundred times per second. Thus, the command signal levels may occur at a relatively rapid rate. In such cases, the average position of the tape tends to remain approximately constant and large amounts of tape do not tend to be withdrawn from or deposited into the bin. Capstan command rate detectors 107 are provided which respond to the rate of the capstan command signals and either inhibit or enable the gate to transmit to the capstan command sensor 104 the forward and reverse command signal levels, respectively, when the command signal rate is higher or lower than a predetermined rate. Separate capstan command rate detectors 108 and 110, respectively, respond to the forward command signals and to the reverse command signals. These detectors are described in greater detail in my aforementioned copending application.

Figure 2:
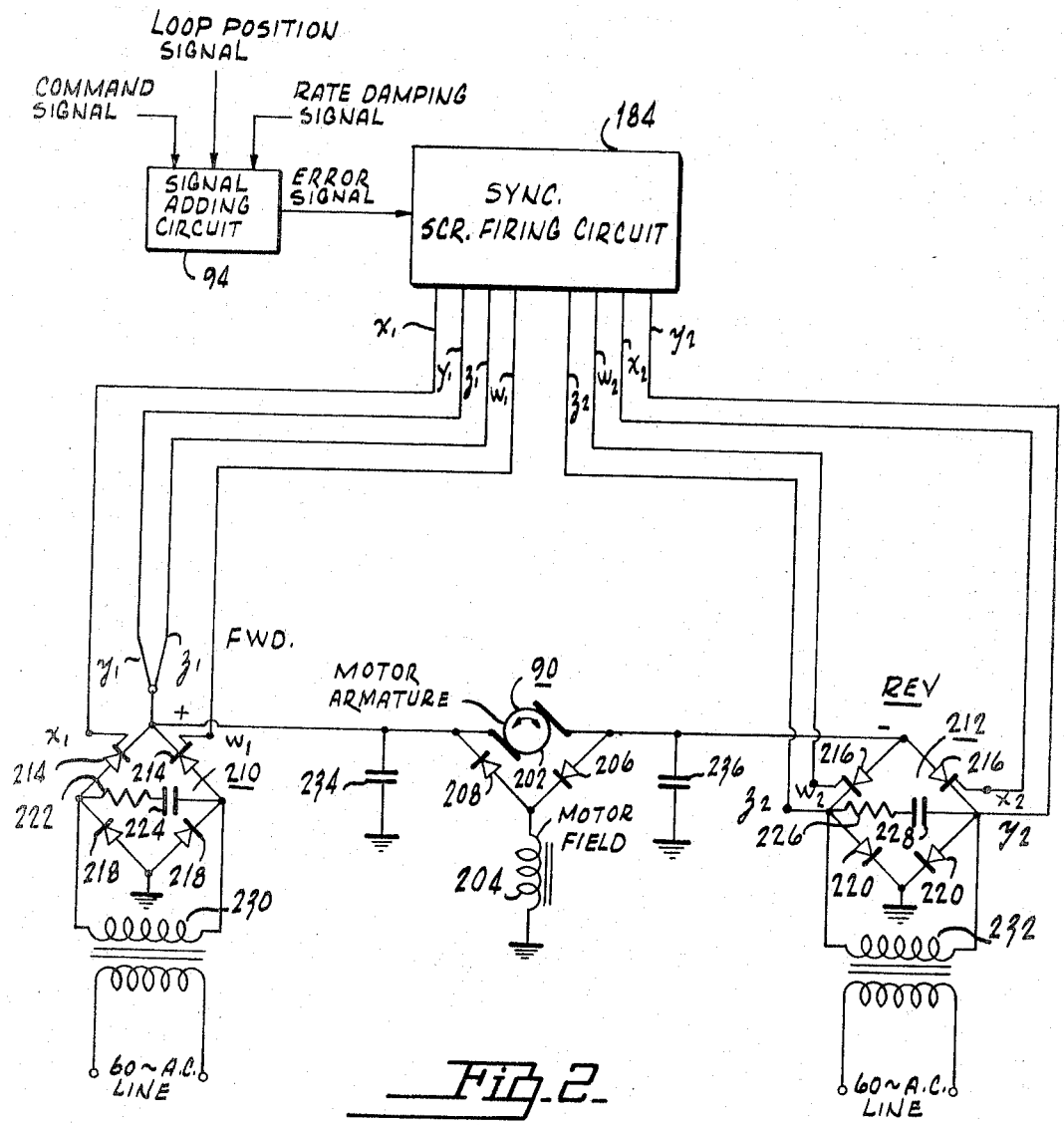
FIG. 2 is a diagram of a motor control circuit in accordance with the present invention, the diagram being partially in circuit schematic and partially in block form.

Referring now to FIG. 2, the motor 90 is a direct current motor of the series type having an armature winding 202 and a field winding 204. A pair of current steering diodes 206 and 208 are connected in series with each other and polarized in the same direction (like terminal to unlike terminal) when viewed in series. The series connected diodes are connected across the armature winding 202, the ends of which may be considered first and second motor terminals. The field winding 204 is connected between ground, which may be considered a third motor terminal, and the junction of these diodes 206 and 208. Two bridge rectifier circuits 210 and 212 for respectively providing output voltages which are positive and negative with respect to ground are provided. The motor 90 rotates in a clockwise sense so as to feed the tape in a forward direction when the rectifier 210 is conditioned for operation; and the motor 90 rotates in a counter-clockwise sense so as to drive the tape in a reverse direction when the other rectifier 212 is operated. The rectifiers 210 and 212 are similar, full-wave rectifier circuits and have adjacent arms including SCR's 214 in the rectifier 210 and SCR's 216 in the rectifier 212. Diodes 218 are included in the other adjacent arms of the rectifier 210 and other diodes 220 are included in corresponding adjacent arms of the rectifier 212. A transient damping circuit, including a resistor 222 and a capacitor 224, is connected across the input terminals of the rectifier 210, and a similar transient damping circuit, including a resistor 226 and a capacitor 228, is connected across the input terminals of the other rectifier 212. Power from the 60-cycle alternating current line is applied across the input terminals of the rectifiers 210 and 212 by way of transformers 230 and 232, respectively. This 60-cycle A.C. line also supplies power to the various electronic circuits of the reel servo 92 and to the computer which provides the command signal levels.

The forward rectifier 210, which provides a positive voltage output, is connected to that same side of the armature winding 202 as is the cathode of one of the steering diodes 208. The reverse rectifier 212, which provides a negative voltage output, is connected to the other terminal of the armature winding 202. The anode of the other steering diode 206 is also connected to that terminal. Accordingly, when the forward rectifier 210 is operating, current flows in one direction (from left to right, as viewed in FIG. 9) through the armature winding 202, through the steering diode 206, and in one direction through the field winding 204 to ground. On the other hand, when the reverse rectifier 212 is operating, current flows in the opposite direction through the motor field winding 204, then through the diode 208, the motor armature winding 202, and back to the reverse rectifier 212. The direction of current flow through the armature winding 202 remains the same regardless of which rectifier 210 or 212 is operating. However, the direction of current through the field winding 204 is reversed. The motor therefore turns in the forward direction (clockwise) when the forward rectifier 210 is operated, and in the reverse direction (counter-clockwise) when the rectifier 212 is operated. The positions of the field and armature windings may be interchanged.

Filter capacitors 234 and 236 are connected between ground and the terminals of the armature winding 202. These capacitors filter the full-wave rectified D.C. outputs of the rectifiers and smooth the current supplied to the motor by the rectifiers 210 and 212. Heating losses in the motor are therefore reduced. The impedance of the load imposed by the motor and the capacitor at power line frequency is essentially a capacitive load, rather than an inductive load, as would be presented by the motor alone. The capacitive load causes more rapid response in the servo system than would an inductive load, and it assures consistent turn-off of the SCR's.

Also included in the motor control apparatus in FIG. 2 is a synchronous SCR firing circuit 184 which is adapted to receive the error signal output of the signal adding circuit 94. The synchronous SCR firing circuit 184 is synchronized with the 60-cycle A.C. line by connections not shown, and may be of any conventional design in accordance with the principles set forth in my aforementioned copending application. The firing circuit 184 provides triggering signals at its outputs to control the firing of the SCR's at the desired times.

The output terminals $x_1$, $y_1$, $w_1$ and $z_1$ of the synchronous SCR firing circuit 184 are connected to the correspondingly designated terminals of the SCR's 214 in the forward rectifier 210. Similarly, the output terminals $x_2$, $y_2$, $w_2$ and $z_2$ of the firing circuit 184 are connected to the correspondingly designated terminals of the SCR's in the reverse rectifier 212. When the error signal is positive corresponding to a forward command, outputs $x_1$, $y_1$, $w_1$ and $z_1$ provide the proper trigger signals to fire SCR's 214; and a positive voltage output is generated by the forward rectifier 210. When the error signal is negative corresponding to a reverse command, outputs $x_2$, $y_2$, $w_2$ and $z_2$ provide the proper trigger signals to fire SCR's 216; and a negative output voltage is provided by the reverse rectifier 212.

The firing of the SCR's is synchronized by the line voltage, as explained above. Accordingly, the duty cycle of the rectifiers varies in accordance with the error signal from the signal adding circuit which is applied to the synchronous SCR firing circuit 184. The average current through the motor and the speed of the motor therefore depends upon the amplitude of the error signal. The direction of rotation of the motor depends upon which of the rectifiers 210 or 212 is operated, which, in turn, depends upon the polarity of the error signal. Accordingly, the direction and speed of the reel motor depends upon the amplitude and polarity of the error signal.

The motor control circuit of FIG. 2 has an additional feature in that it tends to block high frequency noise generated by the turn-on and turn-off of the SCR's from the A.C. power line. For example, the capacitor 234 and the leakage inductance of the transformer 230 operate as a tuned or resonant circuit limiting the rate of rise of current in the SCR's 214 thereby substantially reducing the high frequency noise to a minimum. The capacitor 236 cooperates with the leakage inductance of the transformer 232 in a similar manner to reduce the high frequency noise components.

Figure 3:
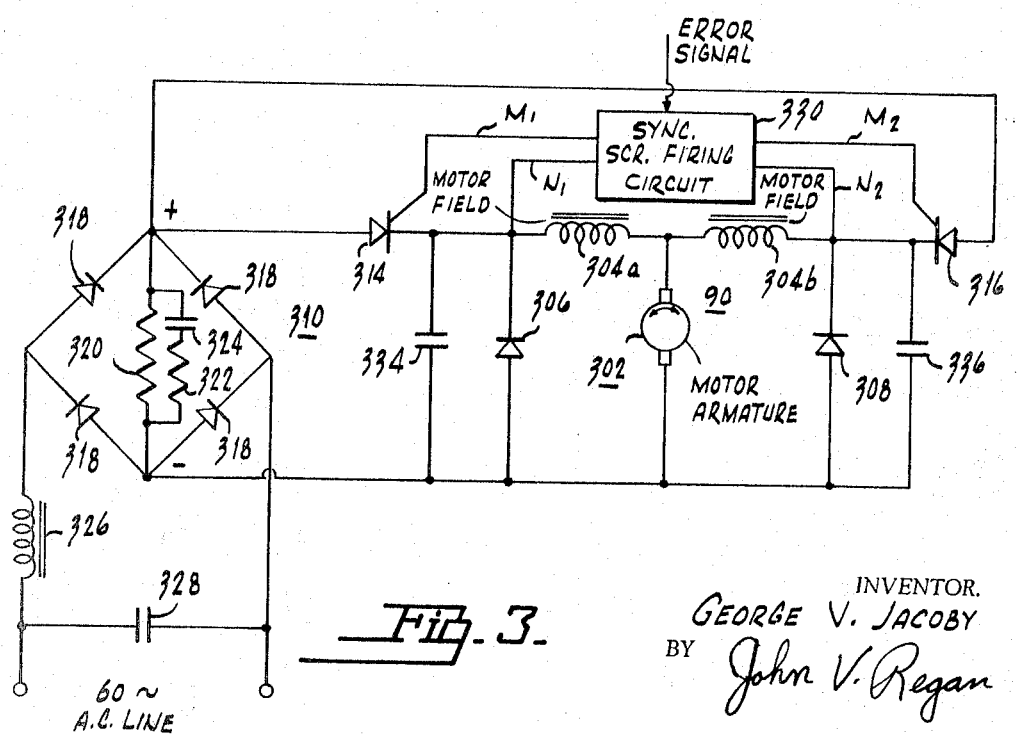
FIG. 3 is a diagram of another embodiment of the motor control circuit, the diagram being partially in circuit schematic and partially in block form.

The motor control apparatus of the present invention may also take the form illustrated in FIG. 3, wherein the motor 90 is a direct current motor of the series type having an armature winding 302 and as plit field winding 304a and 304b. One terminal of each field winding is connected together and to one terminal of the armature winding. A diode 306 is connected between the other terminal of the field winding 304a and the other terminal of the armature winding; and a diode 308 is connected between the other terminal of the field winding 304b and the other terminal of the armature winding 302. The diodes 306 and 308 are polarized as illustrated in FIG. 3 to provide a return path for the inductive current of the field winding when the SCR 314 or 316, as the case may be, turns off.

The cathode electrode of SCR 314 is connected to the circuit junction of the field winding 304a and the diode 306, which junction may be considered as a first terminal of the motor 90. The cathode electrode of the SCR 316 is connected to the junction of the field winding 304b and the diode 308, which junction may be considered as a second motor terminal. A third terminal of the motor 90 may be considered as the common connection of the diode 306 and 308 and the armature winding 302. Filter capacitors 334 and 336 are connected between the first and third motor terminals and the second and third motor terminals, respectively.

Bridge rectifier circuit 310 provides to the anode electrodes of the SCR's 314 and 316 a full-wave rectified D.C. voltage which is positive with respect to the third motor terminal. The bridge rectifier 310 includes four diodes 318, each connected in a separate arm of the bridge. A transient damping circuit including a resistor 322 and a capacitor 324 is connected across the output terminals of the rectifier 310. Also connected across the output terminals of the rectifier 310 is a resistor 320 for the purpose of maintaining a light D.C. load (a few milliamperes) at all times, even when neither of the SCR's 314 and 316 conducts. Power from the 60-cycle A.C. line is applied across the input terminals of the rectifier 310 by way of an inductive device such as a choke 326. A capacitor 328 is connected across the 60-cycle A.C. line.

Also included in the motor control apparatus in FIG. 3 is a synchronous SCR firing circuit 330 which is adapted to receive the error signal output of the signal adding circuit 94 (FIG. 1). The synchronous SCR firing circuit 330 is synchronized with the 60-cycle A.C. line by connections not shown, and may be of any conventional design in accordance with the principles set forth in my aforementioned copending application. The firing circuit 330 provides trigger signals at its output to control the firing of the SCR's 314 and 316.

The firing circuit output terminals $M_1$ and $N_1$ are connected to the gating and cathode terminals, respectively, of the SCR 314; while the output terminals $M_2$ and $N_2$ are connected to the gating and cathode electrodes, respectively of the SCR 316. When the error signal is positive corresponding to a forward command, outputs $M_1$ and $N_1$ provide the proper trigger signals to fire SCR 314 so that a positive voltage output is applied across the first and third terminals of the motor 90 to thereby drive the motor in a forward direction. When the error signal is negative corresponding to a reverse command, outputs $M_2$ and $N_2$ provide the proper trigger signals to fire SCR 316 so that a positive voltage is provided across the second and third motor terminals to drive the motor in the reverse direction.

The filter capacitors 334 and 336 filter the output voltage of the SCR's 314 and 316, respectively, and also assure consistent turn-off of the SCR's. Each of the capacitors 334 and 336 cooperates with the inductance of the choke 326 as a series resonant circuit. By properly selecting the values of the choke 326 and the capacitors 334 and 336, the waveshape of the SCR current (which is the same as the line current) can be made like the half period of a sinewave. Consequently, the rate of rise of current in the SCR's 314 and 316 can be limited so that harmonics are substantially removed from the line current with the result that high frequency noise components are reduced to a minimum. Without the use of the choke and the capacitor, the fast rise time of the SCR current causes ringing transients in the A.C. power line, resulting in serious RF interference in the electronic circuits of the system which are also supplied by the A.C. line. The capacitor 328 connected across the power line serves to remove any remaining low power transients that may leak capacitively through the windings of the choke 326.

Although the motor control apparatus of FIGS. 2 and 3 has been illustrated as having utility for driving the tape reels of a high speed digital type tape system, the invention can also be used to drive the tape reels in a relatively low speed magnetic tape system such a video type. Moreover, the motor control apparatus can be used in any system wherein a D.C. motor is used to control the motion and/or position of the object.

What is claimed is:

1. In reversible motor control apparatus for a D.C. motor having an armature winding means and a field winding means interconnected with first, second and third terminals; an A.C. voltage supply; circuit means having at least first and second silicon-controlled rectifiers for providing a first D.C. voltage between the first and third terminals when said first silicon-controlled rectifier is selected for operation and a second D.C. voltage between said second and third terminals when said second silicon-controlled rectifier is selected for operation, whereby said motor responds to said first and second D.C. voltages to rotate in opposite directions; wherein the improvement comprises:

first capacitor means connected across said first and third terminals,
   second capacitor means connected across said second and third terminals, and
   means including inductive means for coupling said circuit means to said A.C. voltage supply, said inductive means forming a first series resonant circuit with said first capacitor means when said first silicon-controlled rectifier is selected, and a second series resonant circuit with said second capacitor means when said second silicon-controlled rectifier is selected, whereby harmonics associated with the turn on and turn off of said silicon-controlled rectifiers are suppressed.

2. The invention as claimed in claim 1
   wherein said circuit means includes a pair of bridge circuits having said first and second silicon-controlled rectifiers connected in different ones of said pair;
   wherein said inductive means includes a pair of inductive devices; and
   wherein said means couples said A.C. voltage source to each of said rectifier bridge circuits by way of different ones of said inductive devices.

3. The invention as claimed in claim 2
   wherein said inductive devices are transformers.

References Cited

UNITED STATES PATENTS

| | | | |
|---|---|---|---|
| 2,973,468 | 2/1961 | Claflin et al. | 318—300 X |
| 3,050,672 | 8/1962 | Alexanderson | 318—257 |
| 3,119,957 | 1/1964 | Alexanderson | 318—257 |
| 3,165,649 | 1/1965 | Ault | 323—22 |
| 3,184,670 | 5/1965 | Reynolds | 318—300 |

BENJAMIN DOBECK, *Primary Examiner.*